April 12, 1966 J. L. BURROWS 3,246,329
DOPPLER RADAR SYSTEM
Filed July 31, 1963 3 Sheets-Sheet 3

INVENTOR.
JAMES L. BURROWS
BY
*Philip J. McFarland*
ATTORNEY

United States Patent Office 3,246,329
Patented Apr. 12, 1966

3,246,329
DOPPLER RADAR SYSTEM
James L. Burrows, Norwell, Mass., assignor to Laboratory for Electronics, Inc., Boston, Mass., a corporation of Delaware
Filed July 31, 1963, Ser. No. 299,029
6 Claims. (Cl. 343—8)

This invention pertains generally to radar systems and particularly to radar systems of the Doppler type.

It is known in the art that the so-called "Doppler radar," i.e. a radar system utilizing the Doppler effect, is the most practical type of radar system for measuring the relative speed of an airborne vehicle with respect to objects without such a vehicle. The so-called "continuous wave" (CW) Doppler radar is one well-known type of Doppler radar. In such a system, electromagnetic energy at a known frequency is propagated continuously from a transmitting antenna, reflected from targets without the aircraft, and returned to a receiving antenna. The frequency of such reflected energy is then compared with the frequency of the transmitted energy to derive a signal indicative of the Doppler shift of the reflected energy. Consequently, by deriving a plurality of "Doppler shift" signals (each of which represents velocity of the aircraft along a predetermined coordinate), and then processing such signals in an appropriate computer, sufficient navigational data may ultimately be obtained to pilot the aircraft from an origin point to any desired destination point. While the just-mentioned system adequately performs its desired function under many conditions, electrical considerations dictate that separate transmitting and receiving antennas be used. Such a requirement, of course, militates against the use of the CW Doppler radar in aircraft.

In order to accomplish the results of CW Doppler radar, without requiring the use of a separate transmitting and receiving antenna, the so-called "interrupted continuous wave" (ICW) Doppler radar has been evolved. Such a system, as for example the system disclosed in U.S. Patent No. 2,982,956, operates on the principle of "time duplexing" as opposed to the principle of "space duplexing" used in CW systems. That is, a common transmit/receive antenna is used, but the circuitry of the ICW system is so arranged that the transmitting and receiving periods occur in mutually exclusive periods of time. The most efficient operation of the ICW Doppler radar requires that the duty cycle of the transmitter and the receiver each be 50%. Consequently, even though the ICW Doppler radar is much more adapted to installation in aircraft, its transmitter must of necessity be of higher power than the transmitter of a CW Doppler radar having the same range. It follows, then, that if advantage is to be taken of the benefits of both the CW and the ICW types of Doppler radar, the necessity of using separate transmitting and receiving antennas or a transmitter of relatively high power must be avoided.

It is a primary object of this invention to provide an improved Doppler radar system wherein the advantages of the "time duplexing" techniques of an ICW Doppler radar are combined with the advantages of the use of a transmitter of relatively low power.

Another object of this invention is to provide an improved Doppler radar system wherein switching from transmitting to receiving is accomplished in such a manner as to avoid any effect from switching transients.

Still another object of this invention is to provide an improved Doppler radar system meeting the foregoing objects with a transmitter having substantially a 100% duty cycle.

Still another object of this invention is to provide an improved Doppler radar system wherein previously required or highly desirable elements, as the local oscillator and carrier elimination filters, are eliminated.

These and other objects of this invention are attained generally by providing, in a Doppler radar system, a transmitter which alternately transmits a beam of energy on either one of two frequencies from a single antenna. During the periods in which the transmitter transmits energy on the first frequency, reflected signals adjacent the second frequency are received and heterodyned with the frequency then being transmitted. During the periods in which the transmitter transmits energy on the second frequency, reflected signals adjacent the first frequency are received and heterodyned with the frequency then being transmitted. Thus, a substantially continuous heterodyned signal having a first, and second portion is produced. The two portions are identical except that the sense of any Doppler shift is reversed between them. After appropriate amplification down-shifting and narrow-banding heterodyned signal is mixed with a reference signal of proper frequency finally to derive a signal at a frequency determined by the Doppler effect impressed on the transmitted signals. Such signal is then processed to derive an output signal indicating velocity of the aircraft along a predetermined coordinate. The process is repeated by changing the direction of the transmitted beam and mixing signals as required to derive output signals indicating velocity of the aircraft along other predetermined coordinates. Such "velocity" signals may then be continuously integrated to fix the position of the aircraft with respect to the chosen coordinate system.

For a more complete understanding of this invention reference is now made to the accompanying explanation of specific embodiments of the invention illustrated in the drawings, in which.

Figure 1:
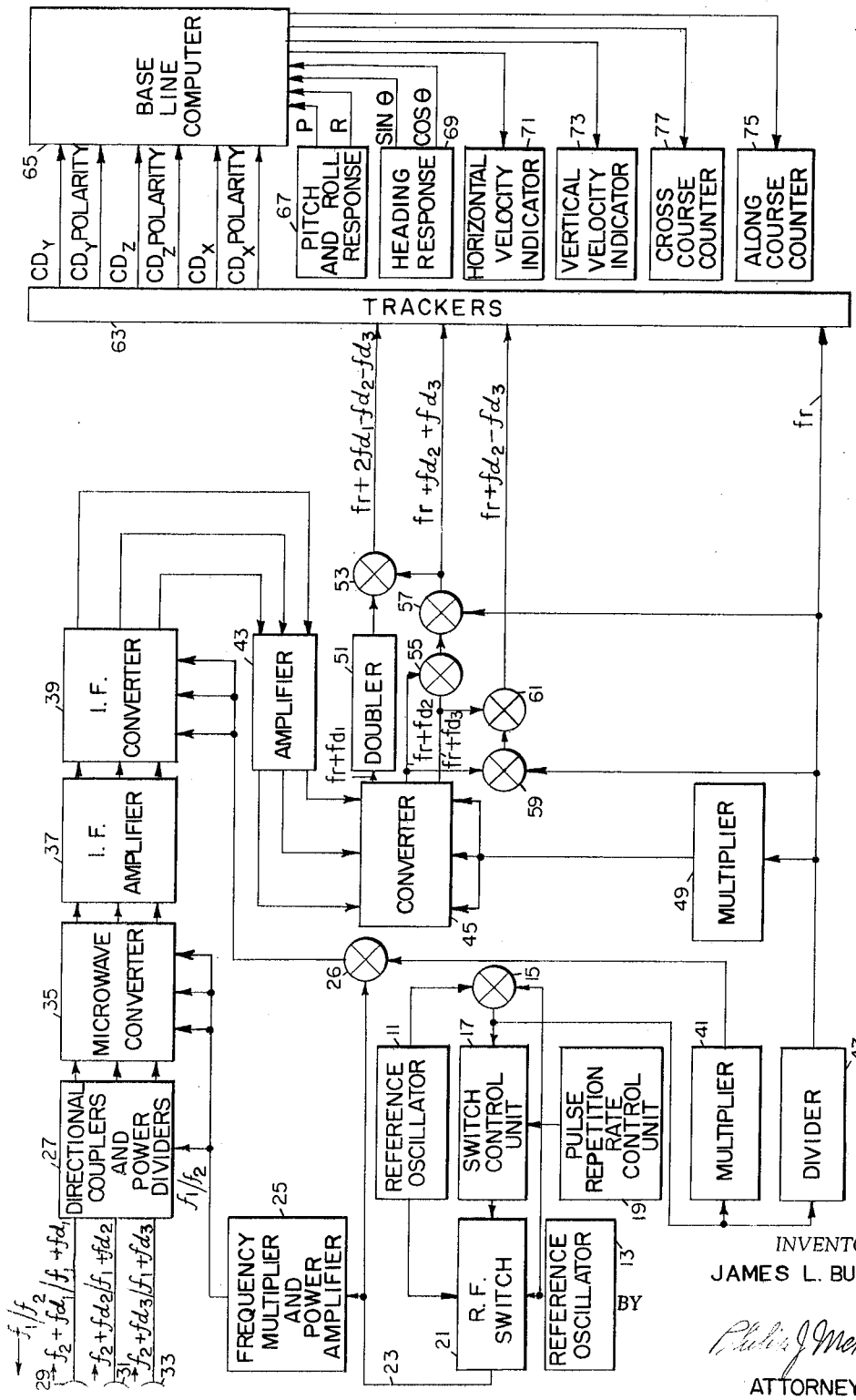
FIG. 1 is a block diagram of a Doppler radar system according to the invention, whereby the movement of an aircraft along each one of three orthogonal axes may be determined.

Referring now to FIG. 1, it should first be noted that the illustrated embodiment contemplates the use of three pencil beams arranged in a conventional T configuration. That is, beam #1 points downwardly at a fixed angle (say 20°) with respect to a plane determined by the longitudinal and athwartship axes of the aircraft in which the system is mounted, the center line of such beam being in a vertical plane containing such athwartship axis and beams #2 and #3 point downwardly at the same angle as beam #1 but forwardly and rearwardly, respectively, in a vertical plane containing the longitudinal axis of the aircraft. It should also be noted that the time sharing features of the invention have been indicated by a convention wherein the alternately existing signals are shown in a fractional notation.

The frequency of the radiated energy in the illustrated system is controlled by either reference oscillator 11 or by reference oscillator 13. In a practical case, reference oscillator 11 may operate continuously at 150 mc. and reference oscillator 13 may operate continuously at 151 mc. A portion of the output of each of the reference oscillators 11, 13 is fed to amixer 15. The beat frequency signal (here 1 mc.) between the two signals into the mixer 15 is fed through a switch control unit 17 (described in more detail hereinafter), which unit is also energized by a signal from a signal from a conventional pulse repetition control unit 19, to produce a control signal for an R.F. switch 21. The remaining portion of the output signal from either of the two reference oscillators 11, 13 is selected in accordance with the state of the R.F. switch 21 and passed over line 23 to a frequency multiplier and power amplifier 25. The latter preferably is a known solid state device, wherein parametric amplifiers are cascaded to produce a signal output at the desired microwave frequencies. In the illustrated case, such a device may multiply the signal on line 23 by a factor of 64, thus making $f_1$ and $f_2$ equal, respectively, to 9600 and 9664 mc. The signals $f_1/f_2$ are applied, through conventional directional couplers and power dividers 27, to antennas 29, 31, 33 affixed to an aircraft (not shown) in the hereinbefore described T configuration.

The energy reflected back from the terrain ($f_2+fd_1/f_1+fd_1$; $f_2+fd_2/f_1+fd_2$; $f_2+fd_3/f_1+fd_3$) beneath the aircraft passes through the antennas 29, 31, 33 and the directional couplers and power dividers 27 to a microwave converter 35. The microwave converter 35 preferably consists of three standard microwave mixers, one for each echo signal. Each of the mixers is also fed by a portion of the signal out of the frequency multiplier and power amplifier 25 to produce signals centered on a desired intermediate frequency, say 64 mc., but shifted in accordance with the amount of the Doppler effect on each. Such signals are amplified in a conventional three-channel wideband I.F. amplifier 37 having a pass band centered on 64 mc., and are then passed to an I.F. converter 39. The latter is also energized by the output signal from the mixer 26. The output signal from the mixer 26 is obtained by first multiplying, by a factor of 64, the output of the mixer 15 in a multiplier 41 and mixing such signal with a portion of the signal on line 23. A moment's thought will make it clear that each output signal of the I.F. converter 39 contains components first at (22 mc.$-fd$) and then at (23 mc.$+fd$), where $fd$ corresponds, respectively, to $fd_1$, $fd_2$ and $fd_3$. The output signals of the converter 39 are fed through an amplifier 43 which is a narrow-band three-channel unit, to a converter 45. The latter element is also fed by a signal derived from mixer 15 through a divider 47, here dividing by a factor of 2, and a multiplier 49, here multiplying its input signal by a factor of 45.

It has been noted that the carrier frequency of the signals out of the amplifier 43 will vary from one frequency to another (from 22 to 23 mc.) depending upon which one of the reference oscillators 11, 13 are connected to line 23 through the R.F. switch 21. Further, it will be noted that the sense of the cap Doppler component in such signals will be correct, in the illustrated case, only when reference oscillator 13 is connected through the R.F. switch 21 to line 23. It may be seen, however, that with the components operating at the frequencies noted, the frequency of the output signal from the multiplier 49 is 22.5 mc., which frequency is midway between the carrier frequencies of the output signals from the amplifier 43. Consequently, the sense of the Doppler components in the output signals of the converter 45 is corrected when reference oscillator 11 is connected through R.F. switch 21 to line 23. That is, components $fr+fd_1$, $fr+fd_2$ and $fr+fd_3$ exists on the output lines of converter 45, regardless of which one of the reference oscillators 11, 13 is connected.

The output signals from the converter 45 are led through a frequency doubler 51 and a matrix of mixers 53, 55, 57, 59, 61 as shown, finally to produce the signals labelled $fr+2fd_1-fd_2-f_3$, $fr+fd_2+fd_3$, and $fr+fd_2-fd_3$. The just-mentioned signals are compared with the signal $f_r$ in trackers 63. Each such comparison in turn produces the signals marked $CDy$, $CDy$ polarity, $CD_z$, $CD_z$ polarity, $CDx$ and $CDx$ polarity. These signals represent, in an analog manner, the velocity of the aircraft along X, Y, and Z coordinates fixed with respect to the aircraft.

It is necessary to convert velocity along the X, Y and Z coordinates to velocity with respect to the terrain beneath the aircraft if useful navigational information is to be derived. Consequently, the signals out of the tracker 63 are fed into a base line computer 65 wherein they are combined with signals from a pitch and roll response unit 67 and a heading response unit 69 finally to produce signals indicative, respectively, of horizontal velocity and vertical velocity. Such signals may then be integrated to produce indications of distance along course and distance across course. These signals are displayed, respectively, on a horizontal velocity indicator 71, a vertical velocity indicator 73, an along-course counter 75 and across-course counter 77.

Figure 2:
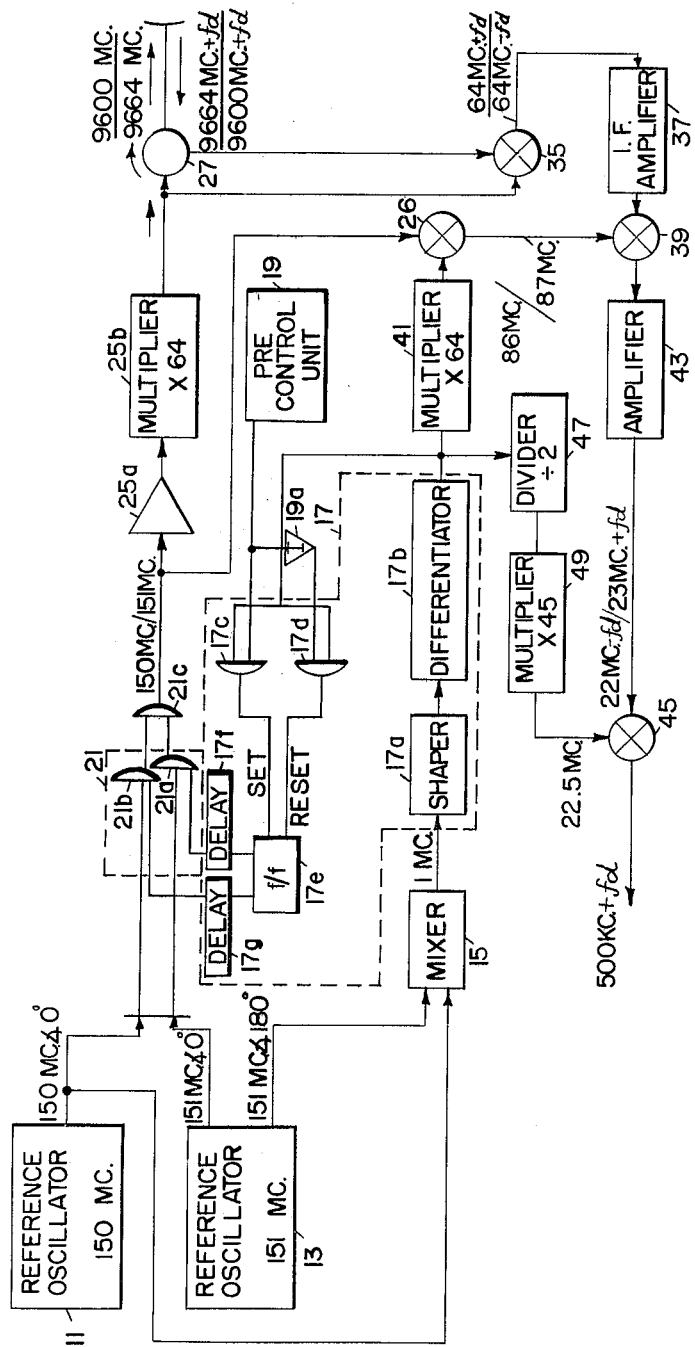
FIG. 2 is a block diagram of a preferred embodiment of the transmitting/receiving portion of one of the three transmitter-receivers of FIG. 1.

Referring now to FIG. 2, a preferred embodiment of a single channel transmitter/receiver of the type used in the system of FIG. 1 is illustrated. In connection with FIG. 2, it should be noted that a numbering convention has been adopted whereby elements which are identical with elements previously described retain their previously assigned number and elements which are obvious modifications of previously described elements are indicated by a number with a prime mark.

With the foregoing in mind, it may be seen that an out-of-phase component from the reference oscillator 13 is mixed in the mixer 15 with the output of the reference oscillator 11 to produce a 1 mc. signal. This signal is passed through a shaper 17a, as a Schmitt trigger circuit, to a differentiator 17b. The output of the differentiator 17b, then, is a train of alternate positive and negative pulses synchronized with the 1 mc. signal out of the mixer 15. The train of pulses out of the differentiator 17b is fed to "and" gates 17c and 17d. The latter elements are also connected to the pulse repetition control unit 19 of the system, "and" gate 17c being connected directly and "and" gate 17d being connected through an inverter 19a. The output of "and" gate 17c is connected to the "set" input of a flip-flop 17e while the output of "and" gate 17d is connected to the "reset" terminal of the flip-flop 17e. The normal output terminal of the flip-flop 17e is connected to a delay unit 17f, as a length of transmission line, while the complementary output terminal of the flip-flop 17e is connected to a delay unit 17g, again as a length of transmission line. Delay unit 17f is connected to an "and" gate 21a and delay unit 17g is connected to an "and" gate 21b. The last-mentioned "and" gates 21a, 21b are also fed, as shown, by the outputs of the reference oscillators 11, 13. The outputs of the "and" gates 21a, 21b are fed through an "or" gate 21c to a power amplifier 25a and frequency multiplier 25b finally produce a microwave signal having one of two frequencies.

The just-described switch control unit and R.F. switch operates in the following manner. Although the phase of the signal out of the reference oscillator 11 is changing continuously with respect to the phase of the signal out of the reference oscillator 13, the change is periodic in nature. The periodicity of the change, further, is measured by the 1 mc. signal resulting from the mixing of the two signals in the mixer 15, it being evident in the illustrated example, that the positive going cross-overs of the 1 mc. signal are spaced 0.5 microsecond from the points in time at which the signals from the reference oscillators 11, 13, are in phase with each other. Consequently, if the "and" gates 21a, 21b are switched exactly 0.5 microsecond after the occurrence of a positive going cross-over of the 1 mc. signal out of the mixer 15, then switching transients would be eliminated.

It would be almost impossible, using conventional circuitry, to ensure an exact delay of 0.5 microsecond in the components (except the delay devices 17f, 17g) making up the switch control unit 17. Obviously, unknown delays of such magnitude would be encountered that, in practice, proper switching would occur only by chance and switching transients would normally occur.

It will be noted, however, that there are 150 positive-going cross-overs of the signal out of the reference oscillator 11 and 151 positive-going cross-overs of the signal out of the reference oscillator 13 between each positive-going cross-over of the 1 mc. signal out of the mixer 15. This fact suggests that switching transients in the "and" gates 21a, 21b, may be, for all practical purposes, eliminated by first arranging for the switching to be done when the signals to be switched are approximately in phase (as by the illustrated switch control unit 17) and then arranging for a fine adjustment of the time when each "and" gates 21a, 21b is enabled so that each is enabled when its signal to be switched is going through a positive-going cross-over. Such a fine adjustment of the time at which "and" gates 21a, 21b are enabled is accomplished here by the delay devices 17g, 17f. It should be noted in this connection that the required range of adjustment of each delay device 17g, 17f is very small (being, respectively, a maximum $\frac{1}{151}$ and $\frac{1}{150}$ of a microsecond) and that it is possible, when the reference oscillators 11, 13 are stable, to use fixed, empirically determined lengths of transmission line for such devices.

Figure 3:
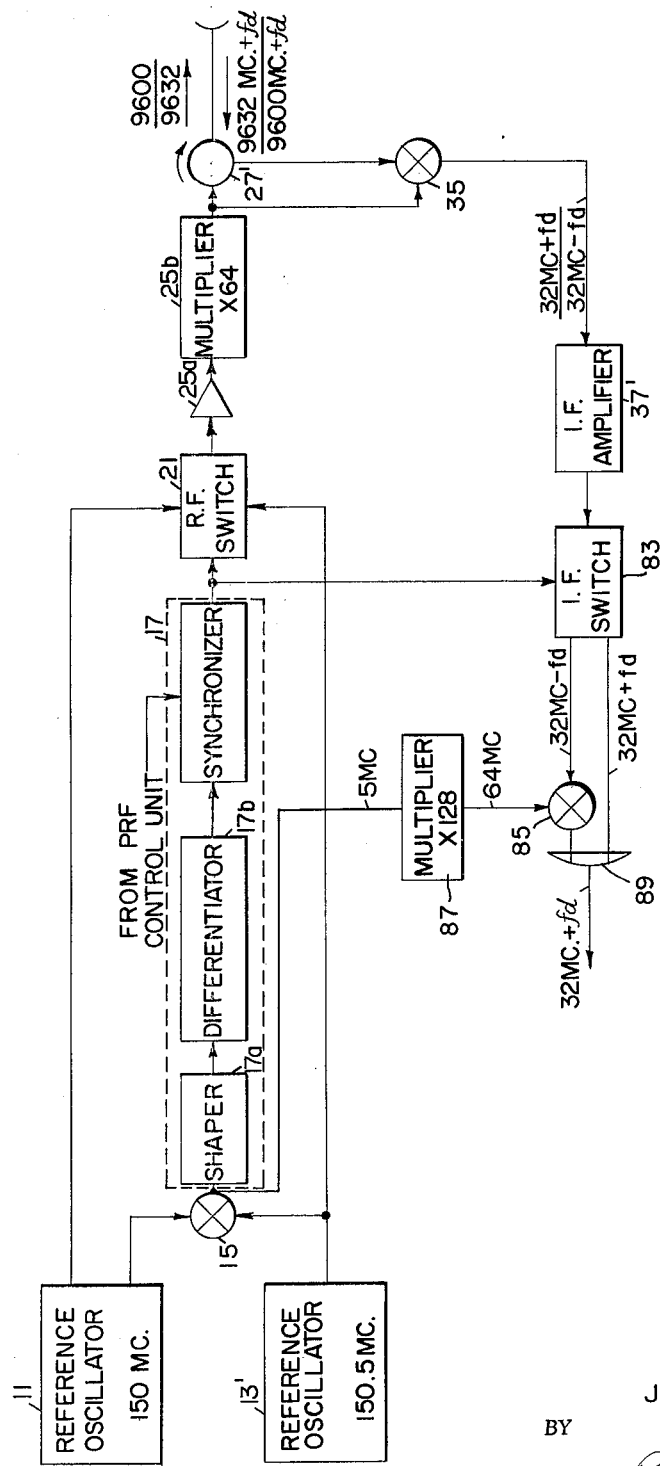
FIG. 3 is a block diagram of an alternative embodiment of the transmitting/receiving portion illustrated in FIG. 2.

Referring now to FIG. 3, an alternative embodiment of a single channel system may be seen. It should be noted that the system of FIG. 3 illustrates mainly a way in which the sense of a Doppler signal may be restored at an intermediate frequency rather than at a lower frequency. As was the case with FIG. 2, elements having the same function as elements described hereinbefore are numbered in the same manner. It follows, then, that except for the indicated differences in frequencies, that transmission and reception (through the I.F. amplifier 37' of FIG. 3) is accomplished in the same manner as explained with reference to FIG. 2.

With the foregoing in mind, it may be seen that the output signal from I.F. amplifier 37' is fed through an I.F. switch 83 wherein it is divided, in synchronism with the operation of R.F. switch 21, into two channels. One channel is led to a mixer 85 wherein the signal is mixed with a signal from a multiplier 87 which element in turn is energized by the signal out of the mixer 15. As shown, then, the output of the mixer 85 is passed through an "or" gate 89 so that the signal out of the I.F. amplifier 37' is reconstituted with both portions of the signal bearing the same Doppler sign.

The I.F. switch 83 and the R.F. switch 21 differ for the reason that the former must separate different portions of a composite signal while the latter must combine two signals to form a composite signal. Such a difference merely means that the I.F. switch 83 may be simpler in construction than the R.F. switch 21. That is, the I.F. switch 83 need consist only of a pair of "and" gates similar in construction to "and" gates 21a, 21b of FIG. 2, alternately enabled by signals from the switch control unit 17.

It will be apparent now that, whichever embodiment of the invention is chosen, the objects of the invention will be attained and that the advantages of continuous transmission will be combined with the advantages of time duplexing. Further, it will be apparent that many modifications and changes may be made in the illustrated embodiments without departing from the inventive concepts thereof. For example, the invention has been shown incorporated in a system having antennas fixed with respect to an aircraft. Obviously if the antennas are mounted on a stable platform, the means for deriving the Doppler signal would differ greatly. In addition, the invention has been illustrated in use in an X-band system although it is useful at any frequency. Even more important, it is not essential to the invention that the particular switching arrangement illustrated and described be used. That is, it is essential only that radio frequency switching means which suppress or eliminate switching transients be used.

In view of the foregoing it is felt that the invention should not be restricted to the illustrated embodiments thereof but rather should be limited only by the spirit and scope of the appended claims.

What is claimed is:
1. A Doppler radar system comprising:
 (a) a first and a second source of electromagnetic wave energy, each source operating continuously to produce energy, respectively, at a first and a second frequency;
 (b) means including switching means coupled to said first and second sources of energy for periodically, and at mutually exclusive times, transmitting microwave energy from the first and the second source of energy;
 (c) means coupled to said last named means for mixing echo signals resulting from the reflection of microwave energy at the first frequency with a portion of the microwave energy at the second frequency and the echo signals resulting from the reflection of microwave energy at the second frequency with a portion of the microwave energy at the first frequency to produce a substantially continuous first signal having the difference of the first and the second frequency as a carrier; and,
 (d) means for deriving a substantially continuous second signal from the substantially continuous first signal, the frequency of the second signal being proportional to the Doppler shift frequency in the echo signals,
 (e) said switching means including means controlled by the first and second source of energy to produce a first and second gating signal; and means for adjusting the occurrence of the first gating signal with respect to the output of the first source of energy and the occurrence of the second gating signal with respect to the output of the second source of energy to cause the switching means to be actuated only when the output of the first and the second source of energy are at a minimum.

2. A Doppler radar system as in claim 1 wherein the means for deriving a substantially continuous second signal comprises:
 (a) means coupled to the output of said switching means for deriving a heterodyning signal having a frequency dependent upon the frequency of said transmitted energy;
 (b) means for mixing the substantially continuous first signal with the heterodyning signal to produce a composite signal;
 (c) means for deriving a continuous signal having a frequency midway between the components of the composite signal; and,
 (d) means for mixing the continuous signal with the composite signal.

3. A Doppler radar system for use in determining the velocity of an aircraft relative to terrain underlying such vehicle, comprising:
 (a) an antenna affixed to the aircraft, the antenna being adapted to produce a plurality of pencil beams at fixed directions with respect to the aircraft and intercepting the terrain;
 (b) means for periodically, and at mutually exclusive times, energizing the antenna with microwave energy of a first frequency and a second frequency;
 (c) means for converting echo signals resulting from reflection of the microwave energy in each one of the plurality of pencil beams from the terrain into a similar plurality of low frequency signals, each one of such low frequency signals containing frequency components dependent upon the Doppler component in each one of the echo signals; and,
 (d) means for processing the low frequency signals to derive a plurality of D.C. signals, the polarity and amplitude of each one of such signals being indicative of the velocity of the aircraft along a coordinate fixed with respect to the terrain, (e) said means for periodically, and at mutually exclusive times, energizing the antenna comprising:
a first and a second contonuously operating oscillator, means for switching between the output of the first and second such oscillator, and, a frequency multiplier coupled to the output of said switching means to produce a microwave signal of alternating frequency.

4. A Doppler radar system as in claim 3 wherein the means for converting echo signals comprises:
(a) means for mixing the echo signals with the output of the frequency multiplier to derive a plurality of composite signals, each on an intermediate frequency carrier equal to the difference in frequency between the first and the second portion of the output of the frequency multiplier;
(b) means, operating in synchronism with the means for switching between the first and the second continuously operating oscillator, for heterodyning each one of the plurality of composite signals with a selected portion of the output of the first and second continuously operating oscillator to divide each one of the composite signals into two portions, each portion of each composite signal having a different carrier frequency; and,
(c) means for mixing the two portions of each one of the last-named plurality of signals with a signal having a frequency midway between the frequency of the two portions finally to produce a plurality of substantially continuous signals, each having a frequency dependent on the Doppler shift impressed on each echo signal.

5. A Doppler radar system comprising:
(a) a first and second source of electromagnetic wave energy signals, each source being operative continuously and at a first and second frequency, respectively
(b) switching means to transmit said first and second frequencies during mutually exclusive time intervals
(c) receiver circuit means to receive first and second Doppler shifted echo signals resulting from the reflection of said first and second transmitted frequency signals, respectively (d) said receiver circuit means including means to mix said first Doppler shifted echo signal with said second transmitted frequency signal so as to provide a first output signal and to mix said second Doppler shifted echo signal with said first transmitted frequency signal to produce a second output signal, said first output signal having a frequency of the difference between said first and second transmitted frequency signals plus the Doppler frequency shift and said second output signal having a frequency of the difference between said first and second transmitted frequencies minus the Doppler frequency shift,
(e) conversion means coupled to the output of said receiver circuit means to correct the sign of the Doppler shift present in said second output signal so as to provide a continuous signal having a frequency of the difference between said first and second frequencies plus the Doppler shift.

6. A Doppler radar system as claimed in claim 5 wherein said conversion means comprises switching means to direct said first and second output signals into first and second circuit channels, respectively, said second circuit channel including a mixer responsive to said second output signal and a correction frequency signal derived from heterodyning said first and second frequency signals generated by said first and second microwave energy sources.

References Cited by the Examiner

UNITED STATES PATENTS

| | | | |
|---|---|---|---|
| 3,015,918 | 1/1962 | Thourel | 343—7.7 |
| 3,018,477 | 1/1962 | Brault | 343—7.7 |
| 3,032,758 | 5/1962 | Stavis | 343—9 |
| 3,101,470 | 8/1963 | Vosburgh | 343—9 |
| 3,120,659 | 2/1964 | Wells | 343—7.7 |
| 3,132,340 | 5/1964 | Galejs | 343—14 |
| 3,165,738 | 1/1965 | Eastwood | 343—7.7 |
| 3,181,148 | 4/1965 | Schiffman | 343—8 |

CHESTER L. JUSTUS, *Primary Examiner.*

R. D. BENNETT, *Assistant Examiner.*